United States Patent Office 3,558,666
Patented Jan. 26, 1971

3,558,666
PHTHALOCYANINE DYESTUFFS
Gerhard Back, Lorrach, Germany, assignor to Ciba Limited, Basel, Switzerland, a Swiss company
No Drawing. Continuation-in-part of application Ser. No. 801,171, Feb. 20, 1969, which is a continuation-in-part of application Ser. No. 653,008, July 13, 1967. This application Dec. 9, 1969, Ser. No. 883,630
Claims priority, application Switzerland, July 6, 1966, 9,820/66
Int. Cl. C07d 27/76; C09b 47/04
U.S. Cl. 260—314.5
2 Claims

ABSTRACT OF THE DISCLOSURE

This invention relates to phthalocyanine dyestuffs corresponding to the formula

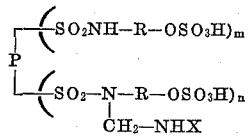
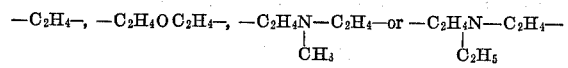

in which P represents a nickel- or cooper-phthalocyanine residue, containing the substituents in 3'-position, R represents $-C_2H_4-$, $-C_2H_4OC_2H_4-$, $-C_2H_4N-C_2H_4-$ or $-C_2H_4N-C_2H_4-$
$\qquad\qquad\qquad\qquad\quad |\qquad\qquad\qquad\qquad\quad |$
$\qquad\qquad\qquad\qquad\quad CH_3\qquad\qquad\qquad\qquad C_2H_5$ X represents chloracetyl, bromacetyl, β-chloropropionyl, β-bromopropionyl, α,β-dichloropropionyl, α,β-dibromopropionyl, acryl, α-chloracryl or α-bromacryl, m and n each represents an integer of at least 1 and n+m represents an integer of at least 3 and not greater than 4.

CROSS-REFERENCES TO RELATED APPLICATION

This is a continuation-in-part of application Ser. No. 801,171, filed Feb. 20, 1969, which itself is a continuation-in-part of application Ser. No. 653,008, filed July 13, 1967 both now abandoned.

DESCRIPTION OF THE PREFERRED EMBODIMENTS

The present invention provides phthalocyanine dyestuffs which correspond to the formula

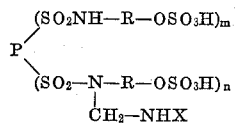
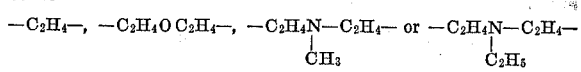

in which P represents a nickel- or cooper-phthalocyanine residue containing the substituents in 3'-position, R represents $-C_2H_4-$, $-C_2H_4OC_2H_4-$, $-C_2H_4N-C_2H_4-$ or $-C_2H_4N-C_2H_4-$
$\qquad\qquad\qquad\qquad\quad |\qquad\qquad\qquad\qquad\quad |$
$\qquad\qquad\qquad\qquad\quad CH_3\qquad\qquad\qquad\qquad C_2H_5$ X represents chloracetyl, bromacetyl, β-chloropropionyl, β-bromopropionyl, α,β-dichloropropionyl, α,β-dibromopropionyl, acryl, α-chloracryl, or α-bromacryl, m and n each represents an integer of at least 1 and n+m represents an integer of at least 3 and not greater than 4.

It is known that acylaminomethyl groups can be introduced into an aromatic or heterocyclic nucleus to replace replaceable hydrogen atoms by reacting N-methylol compounds of α- and/or β-halogen fatty acid amides under suitable conditions, as described by A. Einhorn (Liebigs Annalen der Chemie, 343, p. 207 [1905], and 361, p. 113 [1908]), and that the greater the degree of nucleophilic substitution in the aromatic nuclei, the easier condensation with the methylol compounds proceeds, and with greater yields. Accordingly, suitable nucleophilic substituents in the aromatic residue can promote acylaminomethylation and thereby it may be possible to determine the site of entry of the carboxyl amidomethyl groups.

The present invention is based on the surprising observation that acylaminomethyl groups can be introduced not only into aromatic or heterocyclic rings, but also into sulphonic acid amide groups of phthalocyanine dyestuffs which contain at least one, but preferably within the range of from two to four, sulphonic acid amide groups. This is done in agreement with Einhorn's reaction by reacting a phthalocyanine sulphonic acid N-sulphatoalkylamide, the amide nitrogen atom of which carries a hydrogen atom, with a hydroxymethylamide of a fatty acid which is preferably halogenated or with an N-halogen-methyl-carboxylic amide, whereby the reactive fatty acid amidomethyl group is introduced into the sulphamide groups of the phthalocyanine dyestuff.

The dyestuffs of the invention may be obtained from the corresponding phthalocyanine dyestuff, which contains at least one sulphamide group of the formula

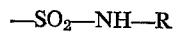

in which R represents an aliphatic chain which may be interrupted by one or more oxygen atoms and/or tertiary nitrogen atoms, preferably an ethylene chain, and which contains a sulphuric acid ester group (or thiosulphuric acid ester group) preferably bound to the terminal carbon atom, by reaction with an N-methylol compound of an aliphatic acid amide, the acyl residue of which is fibre-reactive, or by reaction with a functional derivative of the said methylol compounds which react in like manner.

The phthalocyanine sulphonic acid-N-(sulphatoalkyl)-amides used as starting materials are known, for example, as described in French patent specifications 1,270,150 and 976,047 and Belgian patent specifications 615,208, 563,- 199, 569,439, 573,466 and 565,997, or they may be manufactured by the usual methods from the corresponding phthalocyanine-sulphonic acid-N-hydroxylalkylamides and concentrated sulphuric acid. The phthalocyanine sulphonic acid-N-sulphatoalklamides used as starting materials may also be manufactured directly in the reaction medium from the corersponding hydroxyalkylamides when concentrated sulphuric acid or oleum is used as condensation medium in the amidomethylation in accordance with the invention.

The N-methylolamides used as reactants in the process of the invention may be obtained by adding formaldehyde to an α- or β-halogen-fatty acid amide or to an unsaturated aliphatic acid amide with the assistance of a basic condensing agent, for example, potassium carbonate, or also by the action of a mineral acid under mild conditions. In the process of the present invention use is made primarily of the N-methylol compounds of monochloracetamide, monobromacetamide, β-chloropropionic acid amide, β-bromopropionic acid amide, α,β-dichloropropionic acid amide, α,β-dibromopropionic acid amide, acrylamide, α-chloracrylamide or α-bromoacrylamide.

Condensation of the dyestuff with the methylol compound may be carried out in the presence of an acid condensing agent or a dehydrating agent having a similar reaction. Compounds of the kind mentioned that may be used are concentrated hydrochloric acid, zinc chloride, phosphorus pentoxide, acetic anhydride, syrupy phosphoric acid, mixtures of aluminum chloride and pyridine and oleum. The preferred condensing agent is, however, concentrated or anhydrous sulphuric acid, because it can generally also serve as a solvent for the reactants. The reaction temperature may vary within wide limits, and it depends mainly on the kind of condensing agent or dyestuff used. The reaction generally proceeds quickly at room temperature (15 to 30° C.) when carried out in concentrated sulphuric acid and is complete.

In some cases it may be necessary to work at an elevated temperature, for example, at a temperature within the range of from 40 to 80° C., especially when several carboxylic amidomethyl groups are to be introduced. Operation at an elevated temperature is, however, possible only when the reactants are not destroyed under the reaction conditions and when possible sulphonation of the reaction product is not undesirable. The finished reaction products are separated by pouring the sulphuric acid solution or suspension into iced water and are then isolated in the usual manner.

The N-methylolamides may be replaced by reactive, functional derivatives thereof, provided they react in the same way. For example, use may be made of the esters obtained by treating the said methylol compounds with inorganic or organic acids or acid halides or anhydrides; it is also possible to use the di-(fatty acid amidomethyl)-ethers obtained by auto-condensation in the presence of, for example, phosphorous oxychloride. Since, however, these functional derivatives have to be prepared from the methylol compounds, the first method is almost always preferred. In some isolated cases, however, where the Einhorn method does not produce satisfactory results, the recation may be carried out successfully with these derivatives, especially with the N-chlormethylamides. In some cases the process of the invention may be simplified by reacting a mixture of formaldehyde and the acid amide with the dyestuff in a single-step process instead of using the finished methylol derivative of the amide as the starting material. Another procedure which may be followed instead of starting with the finished phthalocyanine sulphonic acid-N-sulphatoalkylamide is to dissolve the corresponding hydroalkylamide in concentrated sulphuric acid, whereby the hydroxyl group of the sulphonic acid alkylamide group is esterified (sulphated), and then to react the solution so obtained with the methylol derivative of the amide or a mixture of formaldehyde and an amide in a single step process.

A modification of the process for manufacturing the dyestuffs comprises dissolving the acid amide in concentrated sulphuric acid, adding a dihalogenated dimethyl ether to the solution and reacting the dyestuff to be reacted in this reaction mixture at a temperature within the range of from 15 to 30° C. Isolation of the acylamidomethylated dyestuff is effected in the manner described above.

Furthermore, the dyestuffs of the invention, which contain an unsaturated acyl residue, for example, an acrylic, a chloracrylic or a bromacrylic residue, may also be manufactured from the corresponding halogenated fatty acid derivatives, for example, from dyestuffs containing a β-chloropropionyl, an β-bromopropionyl, an α,β-dichloropropionyl or an α,β-dibromopropionyl residue, by elimination of hydrogen halide by means of a compound having an alkaline reaction.

It is also possible to hydrolyse N-acylamidomethyl-N-sulphatoalkylamides obtainable by amidomethylation and to re-acylate them at the liberated aminomethyl group with acid halides containing fibre-reactive acyl residues for the purpose of introducing a fibre-reactive group.

The dyestuffs obtainable by the process of the invention are suitable for dyeing nitrogenous fibres, for example, leather, silk, polyamide and polyurethane fibres and especially wool. They produce very smooth dyeings on these fibres when applied in the form of an aqueous, acidic solution. Many of these dyestuffs display high affinity for the said nitrogenous materials in a slightly acid to acid bath and the dyebath thus has a very good rate of exhaustion. The dyeings obtained, especially dyeings on wool, are smooth and are distinguished by very good fastness to washing and milling. They also possess good fastness to light.

The dyestuffs suitable for cellulose are, especially those containing within the range of from two to four sulphato groups per dyestuff molecule. They are suitable for dyeing cellulose by the so-called pad dyeing process in which the material is impregnated with the aqueous dyestuff solution, which may also contain salt, and the dyestuffs are fixed on the material by an alkali treatment, preferably with the application of heat. This process yields dyeings which are generally distinguished by good fastness to light and especially by excellent fastness to washing.

It is also possible to produce valuable and fast prints on cellulosic fibres when the dyestuffs are fixed on the printed material by heat treatment in the presence of an alkali.

After dyeing or printing it is advantageous to remove as much unfixed dyestuff as possible. This is done by thoroughly rinsing the material in warm and cold water and subjecting it to a soaping process in the presence of a non-ionic dispersing and/or wetting agent.

The following examples illustrate the invention. Unless otherwise stated, the parts and percentages are by weight.

EXAMPLE 1

60 parts of copper-phthalocyanine are introduced into 285 parts by volume of chlorosulphonic acid within 15 minutes. The batch is heated for 1 hour at a temperature of from 70 to 75° C. while stirring and the temperature is then raised to a temperature within the range of from 130 to 135° C., within 1½ hours. The batch is then stirred for 4 hours at that temperature. The batch is cooled to 80° C., and then 125 parts by volume of thionyl chloride are added dropwise during 1 hour. Stirring is then continued for a further hour at a temperature of from 75 to 80° C. The reaction is then cooled to room temperature and discharged on to ice. The copper-phthalocyanine-3',3'',3''',3''''-tetrasulphonic acid chloride which precipitates is isolated by filtration and washed with iced water until free from acid.

The sulphonic acid chloride paste so obtained is stirred into 250 parts by volume of water and 250 parts of ice. 30 parts by volume of ethanolamine and 30 parts of sodium bicarbonate are added to the suspension and the whole is then stirred for 24 hours at 35 to 40° C. The batch is diluted with 500 parts by volume of water, the sulphamide obtained is isolated by filtration, washed with water and then dried in vacuo at 80° C.

100 parts of finely ground copper-phthalocyanine-3',3'',3''',3''''-tetrasulphonic acid-N,β-hydroxyethylamide are dissolved at 0 to 5° C. in 500 parts by volume of sulphuric acid monohydrate while stirring. 60 parts of N-methylol-chloracetamide are added at the same temperature and the reaction mixture is stirred for 6 hours at 0 to 5° C., and then for a further 18 hours at room temperature. It is discharged on to 4,000 parts of ice, potassium chloride is added to the deep blue solution so obtained and the dyestuff which precipitates is isolated by filtration. The strongly acidic paste is stirred into 1,000 parts of iced water, the solution so obtained is neutralized with sodium hydroxide solution and the dyestuff is again precipitated by the addition of potassium chloride. It is then isolated by filtration and dried in vacuo at 40° C. After grinding, it is in the form of a dark blue powder which dissolves readily in water to produce a turquoise blue solution and in concentrated sulphuric acid to produce an olive green solution. According to an elemental analysis, it contains about 3,5-N,β-sulphatoethyl-N-chloracetylaminomethyl - sulphamyl groups and 0,5-N,β-sulphatoethylsulphamyl groups in each phthalocyanine nucleus. It dyes wool full, turquoise blue shades possessing very good fastness to washing, milling and potting and good fastness to light when applied by the dyeing process described herein.

If instead of 60 parts only 25 parts of N-methylolchloracetamide are added, the resulting dyestuff contains 2-N,β-sulphatoethyl - N - chloracetylaminomethylsulphamyl groups and 2-N,β-sulphatoethylsulphamyl groups in each phthalocyanine nucleus.

A dyestuff having similar properties is obtained by using 125 parts of N-methylol-α-dibromopropionamide instead of N-mehylolchloracetamide. As confirmed by an elemental analysis, it corresponds to the formula:

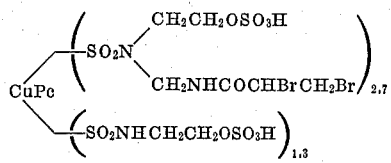

wherein CuPc is the residue of copper phthalocyanine containing the substituents in the four 3'-positions of the phthalocyanine nucleus.

EXAMPLE 2

100 parts of copper-phthalocyanine-3',3'',3''',3''''-tetrasulphonic acid-N,β-hydroxy-ethylsulphamide are dissolved at 0 to 5° C. in 500 parts by volume of sulphuric acid monohydrate. 16 parts of paraformaldehyde are added at the same temperature, while stirring, followed by 34 parts of acrylamide. The deep green reaction mixture is stirred for 6 hours at 0 to 5° C., and then for a further 18 hours at room temperature. Working up is effected in the manner described in the preceding example and a dyestuff is obtained which is readily soluble in water and which dyes wool full, turquoise blue shades possessing very good properties of wet fastness and good fastness to light when applied by the dyeing process described herein. It contains approximately 2-N,β-sulphatoethyl - N - acryloylaminomethylsulphamyl group and 2-N,β-sulphatoethylsulphamyl groups for each copper-phthalocyanine nucleus.

Dyeing procedure for wool 100 parts of wool knitting yarn are entered at 50 to 80° C. into a dyebath containing, per 3,000 parts of water, 10 parts of crystallized sodium sulphate, 6 parts of 40% acetic acid, 0.5 part of the addition product obtained from oleylamine and ethylene oxide described below and 2 parts of dyestuff. The bath is raised to the boil during half an hour and dyeing is carried out at the boil for one hour. The wool is then rinsed and dried.

Preparation of the ethylene oxide addition product 1 part of finely divided sodium is added to 100 parts of commercial oleylamine, the batch is heated to 140° C. and then ethylene oxide is introduced at 135 to 140° C. As soon as the ethylene oxide is quickly absorbed, the reaction temperature is lowered to 120 to 125° C. and introduction of ethylene oxide is continued until 113 parts have been taken up. The reaction product so obtained yields a virtually colourless solution in water.

Printing procedure 2 parts of dyestuff are mixed with 20 parts of urea, dissolved in 28 parts of water and the solution is stirred into 40 parts of a 5% sodium alginate thickener. 10 parts of a 10% sodium carbonate solution are then added.

This printing paste is applied to a cotton fabric on a roller printing machine, the fabric is dried, and then steamed for 8 minutes at 100° C. in saturated steam. The printed fabric is then thoroughly rinsed in cold and hot water and dried.

A turquoise blue print which is fast to boiling is obtained.

EXAMPLE 3

60 parts of nickel-phthalocyanine are converted into the corresponding 3',3'',3''',3''''-tetrasulphochloride by the method described in Example 1. This is then reacted with ethanolamine in an analogous manner to form nickel - phthalocyanine-3',3'',3''',3''''-tetrasulphonic acid-N,β-hydroxyethylamide.

100 parts of finely ground nickel-phthalocyanine-3',3'',3''',3''''-tetra - N,β - hydroxyethylsulphonamide are dissolved at a temperature of from 0 to 5° C. in 500 parts by volume of sulphuric acid monohydrate. 54 parts of N-methylol-α-bromoacrylic acid amide are then introduced at the same temperature. The reaction mixture is then stirred for 6 hours at a temperature within the range of from 0 to 5° C. and then for a further 18 hours at room temperature.

The batch is discharged on to 4,000 parts of ice, potassium chloride is added to the greenish blue solution so obtained and the dyestuff which precipitates is isolated by filtration. The paste is stirred into 1,000 parts of iced water, the solution so obtained is neutralized with dilute sodium hydroxide solution, the dyestuff is again precipitated by the addition of potassium chloride, isolated by filtration and dried in vacuo at 40° C.

The new dyestuff is a dark blue powder which dissolves readily in water to produce a green-blue solution and in concentrated sulphuric acid to produce a yellow-green solution. According to an elemental analysis the dyestuff has the following constitution:

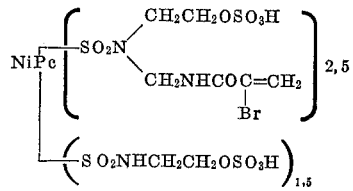

wherein NiPc is the residue of nickel phthalocyanine containing the substituents in the 3'-positions of the phthalocyanine nucleus. It dyes wool full, greenish blue shades possessing very good properties of wet fastness and good fastness to light when applied by the dyeing process described herein.

EXAMPLE 4

132 parts of the intermediate product of the formula

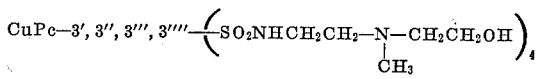

manufactured in accordance with published German patent application No. 1,237,242, Example 2, are dissolved at a temperature of from 0 to 5° C. in 500 parts by volume of sulphuric acid monohydrate while stirring. 40 parts of N-methylolchloracetamide are added at the same temperature and the reaction mixture is stirred for 6 hours at a temperature within the range of from 0 to 5° C. and then for a further 18 hours at room temperature.

The viscous, dark green reaction solution is worked up by the method described in Example 1 to produce a dyestuff giving a turquoise blue solution in water. The dyestuff corresponds to the formula

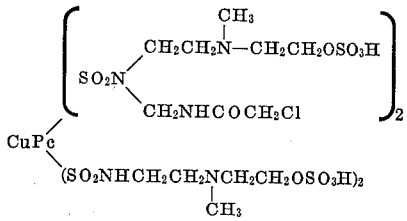

The substituents are located in the four 3'-positions. It dyes wool greenish turquoise shades possessing very good properties of wet fastness when applied by the process described herein.

EXAMPLE 5

400 parts of a paste of copper-phthalocyanine-tetra-3',3'',3''',3''''-sulphonic acid chloride, obtained from 60 parts of copper-phthalocyanine as described in Example 1, are stirred into 250 parts by volume of water and 250 parts of ice. 50 parts of ethyleneglycol-mono-β-aminoethylether and 30 parts of sodium bicarbonate are added to the suspension and the whole is then stirred for 24 hours at 30 to 40° C. The batch is diluted with 500 parts by volume of water, the sulfamide obtained is isolated by filtration, washed well with water and then dried in vacuo at 80° C.

123 parts of the obtained intermediate product of the formula

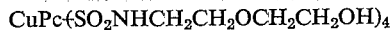

CuPc(SO₂NHCH₂CH₂OCH₂CH₂OH)₄ are dissolved at 0 to 5° C. in 500 parts by volume of sulphuric acid monohydrate while stirring. 55 parts of N-methylolbromacetamide are added at the same temperature and the reaction mixture is stirred for 6 hours at 0 to 5° C., and then for a further 18 hours at room temperature. It is discharged on to 4000 parts of ice, potassium chloride is added to the deep blue solution so obtained and the dyestuff which precipitates is isolated by filtration. The strongly acidic paste is stirred into 1000 parts of iced water, the solution so obtained is neutralized with sodium hydroxyde solution and the dyestuff is again precipitated by the addition of potassium chloride. It is then isolated by filtration and dried in vacuo at 40° C. After grinding, it is in the form of a dark blue powder, which dissolves readily in water to produce a deep turquoise blue solution. It dyes wool full, turquoise blue shades possessing very good fastness to washing, milling and potting and good fastness to light, when applied by the dyeing process described herein.

According to an elemental analysis, the new dyestuff has the formula

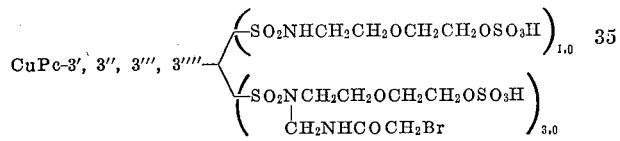

A dyestuff having similar properties is obtained by using a mixture of 22 parts of β-chloropropionic acid amide and 16 parts of paraformaldehyde following the process as described in Example 2, instead of N-methylolbromacetamide. The obtained dyestuff has the constitution

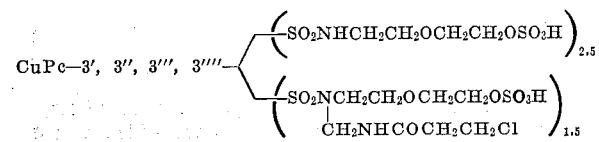

A further dyestuff of equal tinctorial properties is obtained, when instead of N-methylolbromacetamide 20 parts of β-bromopropionic acid amide and 16 parts of paraformaldehyde are used as described above. It corresponds to the formula

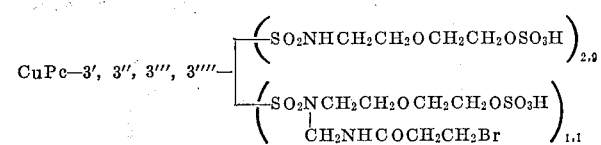

EXAMPLE 6

136 parts of the intermediate product having the formula

manufactured in accordance with published German patent application No. 1,237,242, are dissolved at a temperature of from 0 to 5° C. in 500 parts by volume of sulphuric acid monohydrate while stirring. 60 parts of N-methylol-α,β-dichlorpropionic acid amide are added at the same temperature and the reaction mixture is stirred for 6 hours at a temperature within the range of from 0 to 5° C. and then for a further 18 hours at room temperature.

The viscous, dark green solution is then worked up by the method described in Example 1 to produce a dyestuff of the following formula

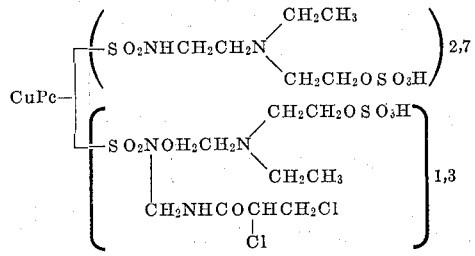

Wool is dyed greenish turquoise shades possessing good fastness properties when the dyestuff is applied by the process described herein.

Another dyestuff of similar properties is obtained, when instead of N-methylol-α,β-dichlorpropionic acid amide 22 parts of α-chloracrylic acid amide and 16 parts of paraformaldehyde are used, according to the method described in Example 2. The new dyestuff has the following constitution

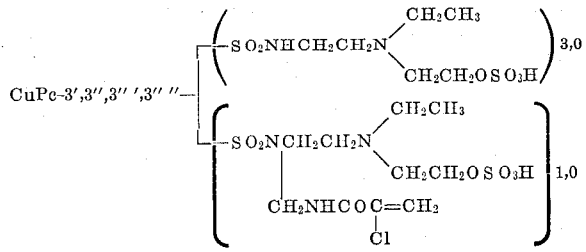

The tinctorial behaviour in wool dyeing is the same one as with the aforementioned products.

What is claimed is:

1. A phthalocyanine dyestuff which corresponds to the formula

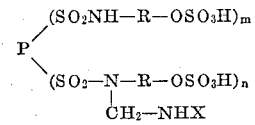

in which P represents a nickel- or copper-phthalocyanine residue containing the substituents in 3′-position, R represents

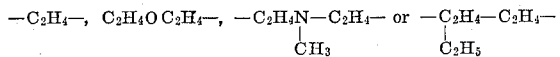

X represents chloracetyl, bromacetyl, β-chloropropionyl, β-bromopropionyl, α,β-dichloropropionyl, α,β-dibromopropionyl, acryl, α-chloracryl or α-bromacryl, m and n each represents an integer of at least 1 and n+m represents an integer of at least 3 and not greater than 4.

2. A phthalocyanine dyestuff as claimed in claim 1, wherein R is —C₂H₄—.

References Cited

UNITED STATES PATENTS 3,424,544   1/1969   Wardleworth et al. __ 260—314.5

JOHN D. RANDOLPH, Primary Examiner

H. I. MOATZ, Assistant Examiner

U.S. Cl. X.R.

8—54, 54.2, 178, 179

UNITED STATES PATENT OFFICE
CERTIFICATE OF CORRECTION

Patent No. 3,558,666      Dated January 26, 1971

Inventor(s) GERHARD BACK

It is certified that error appears in the above-identified patent and that said Letters Patent are hereby corrected as shown below:

Column 8, claim 1, delete the second structural formula and insert the following:

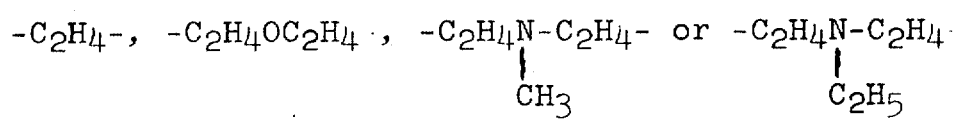

Signed and sealed this 18th day of January 1972.

(SEAL)
Attest:

EDWARD M. FLETCHER, JR.　　　　ROBERT GOTTSCHALK
Attesting Officer　　　　　　　　Acting Commissioner of Patents